July 5, 1927.
C. F. PYM
1,634,511
LASTING MACHINE
Filed Aug. 11, 1922
8 Sheets-Sheet 3
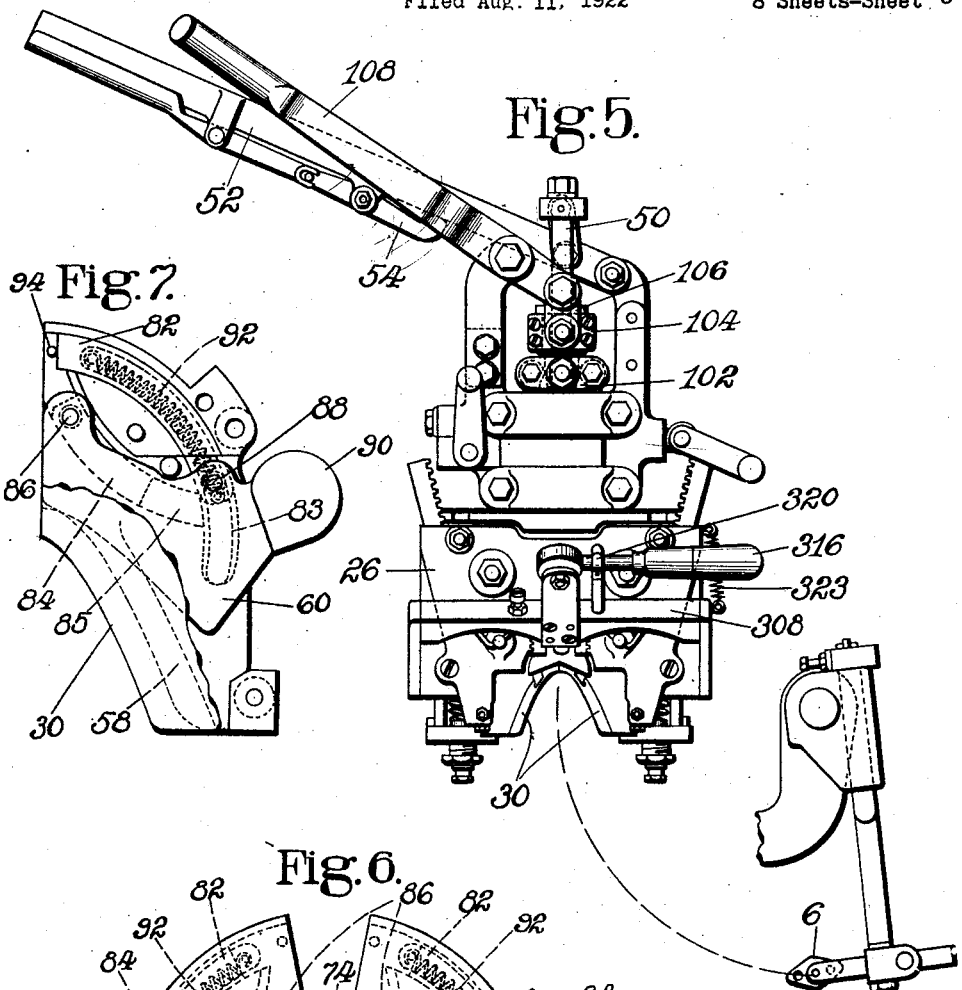
INVENTOR.
Charles F. Pym
By his Attorney
Nelson W. Howard

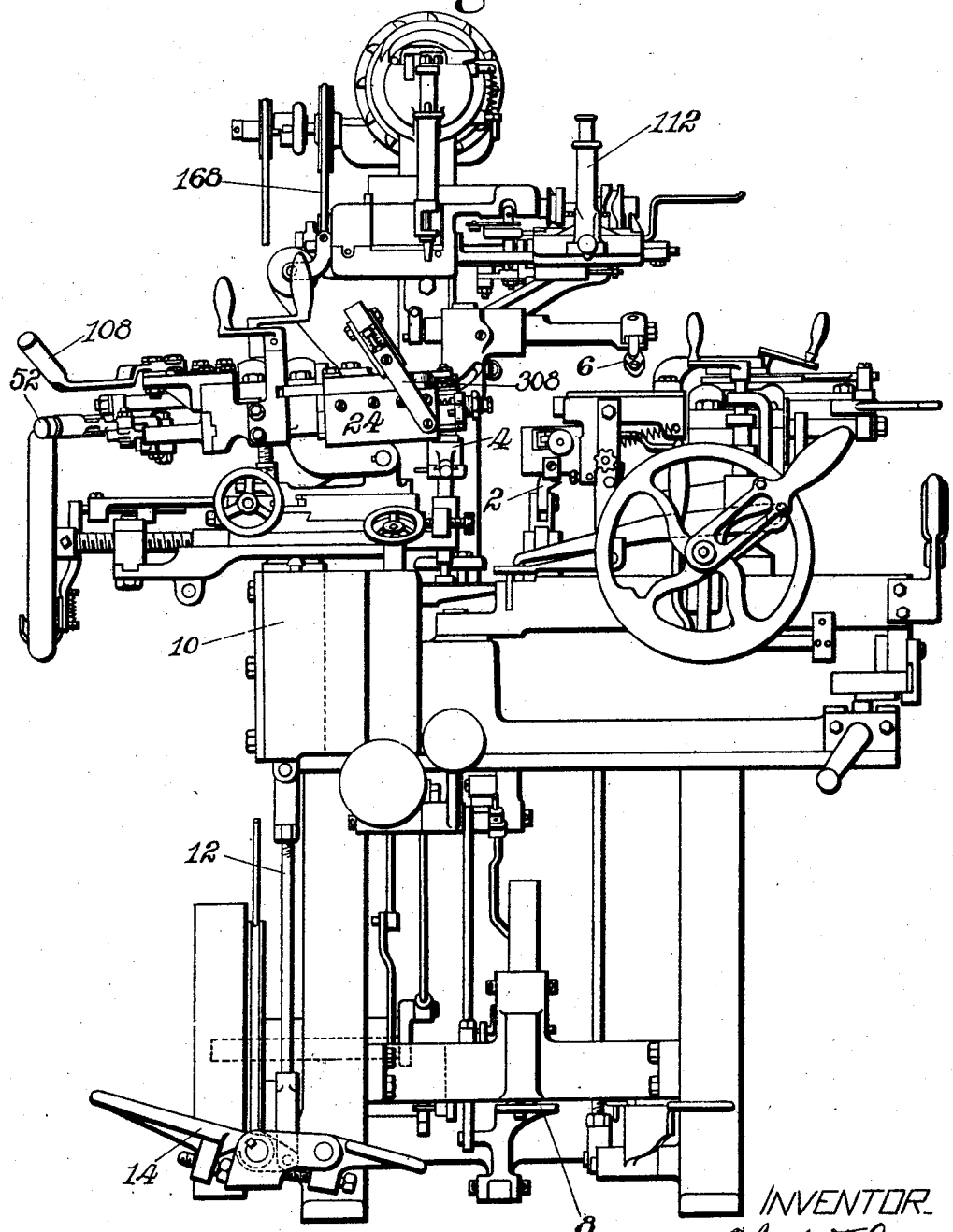

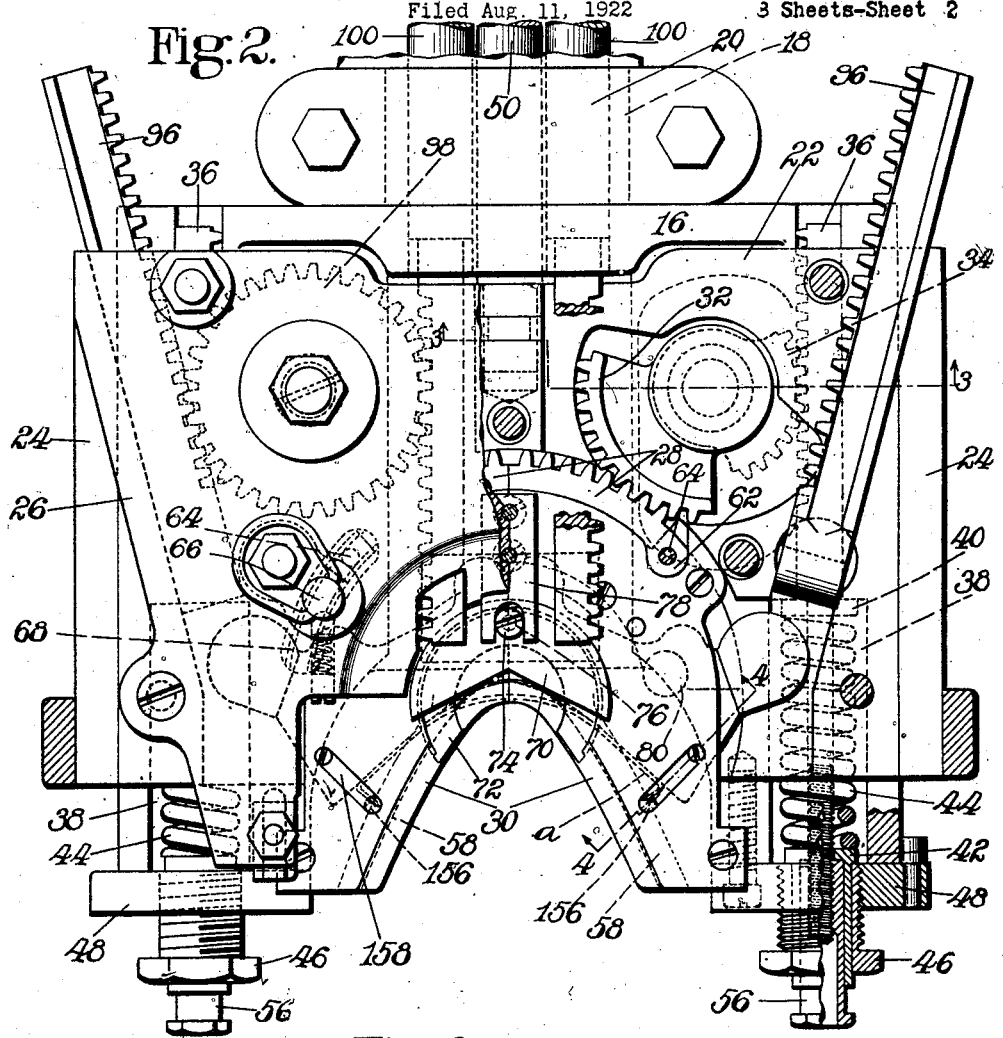
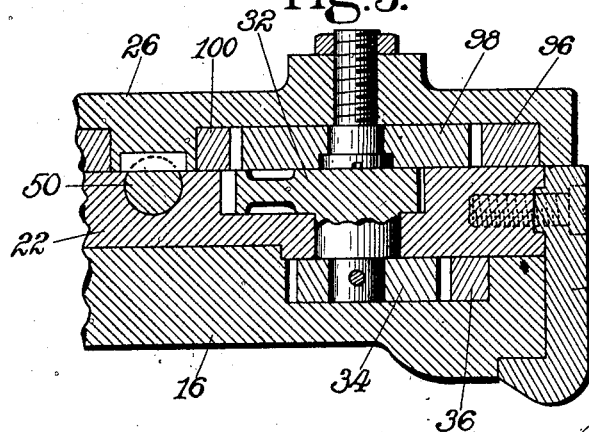

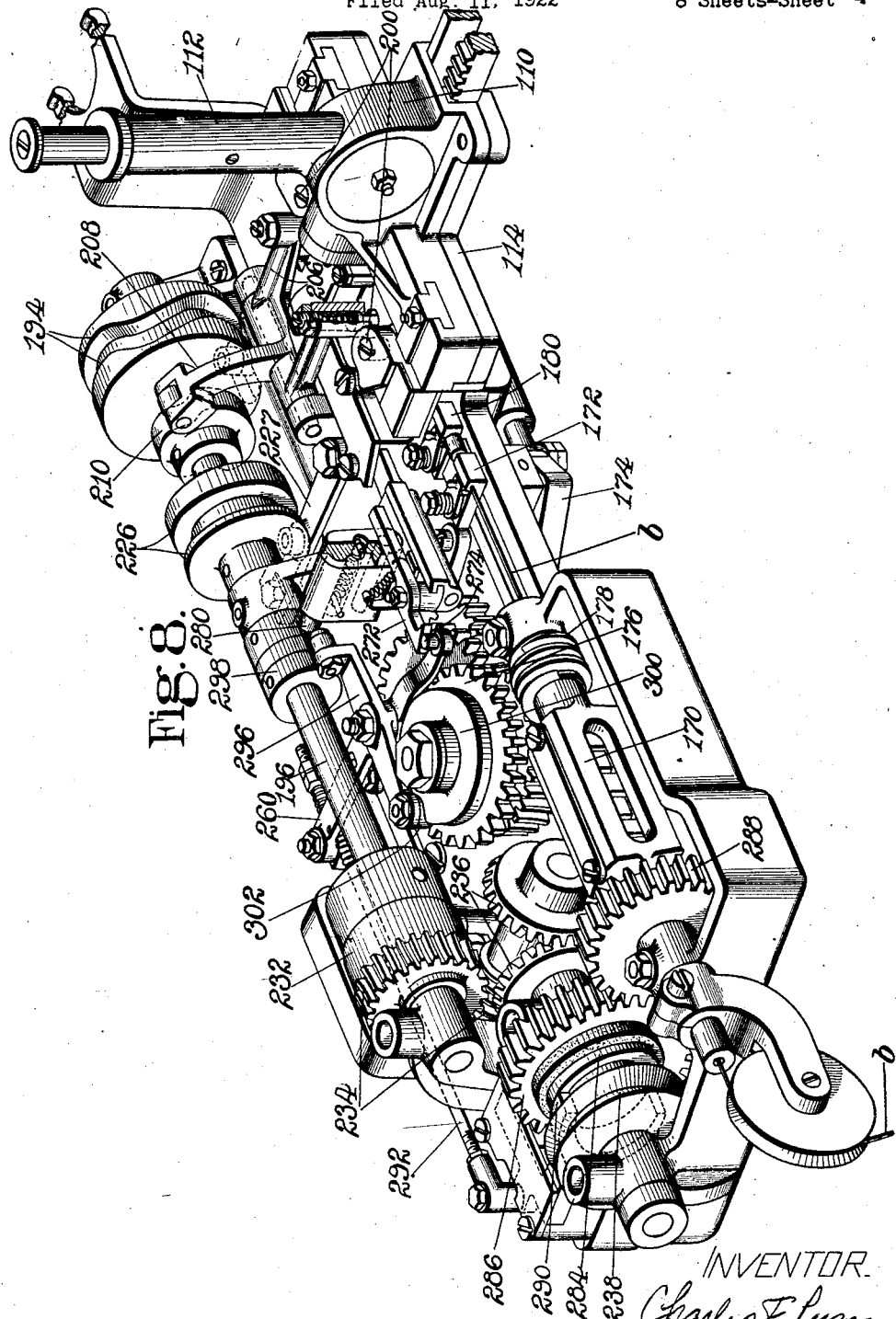

July 5, 1927. 1,634,511
C. F. PYM
LASTING MACHINE
Filed Aug. 11, 1922 8 Sheets-Sheet 5

INVENTOR.
Charles F. Pym
By his Attorney
Nelson W. Howard

July 5, 1927.
C. F. PYM
1,634,511
LASTING MACHINE
Filed Aug. 11, 1922
8 Sheets-Sheet 6
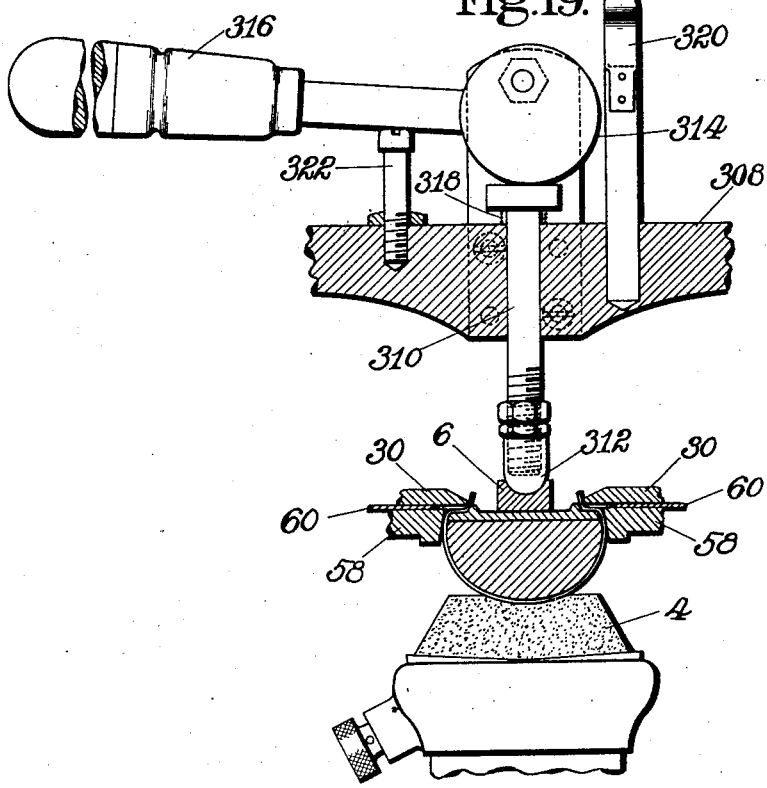
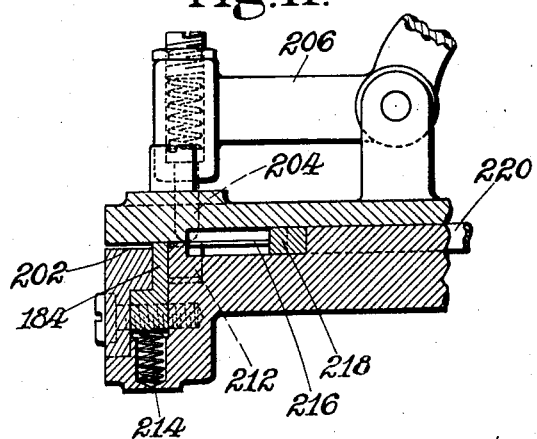
INVENTOR.
Charles F. Pym
By his Attorney
Nelson W. Howard July 5, 1927.
C. F. PYM
1,634,511
LASTING MACHINE
Filed Aug. 11, 1922
8 Sheets-Sheet 7
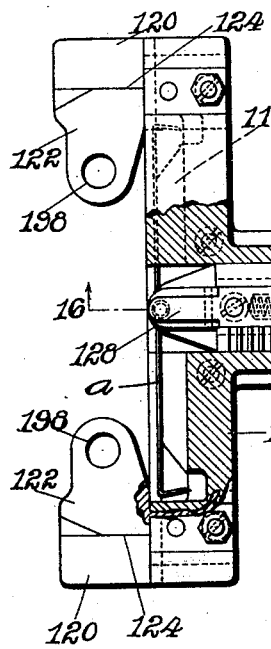
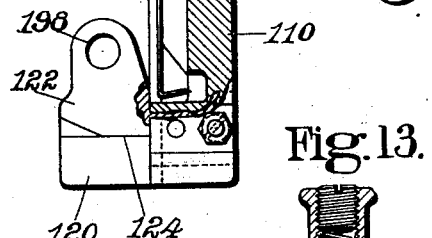
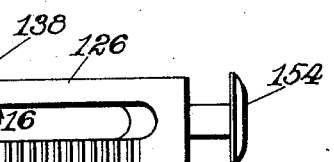
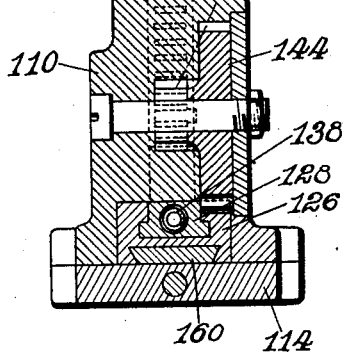
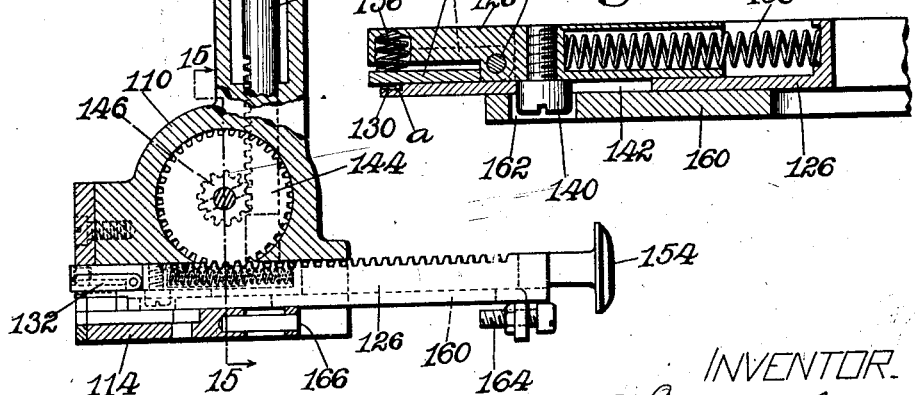

July 5, 1927.

C. F. PYM 1,634,511

LASTING MACHINE

Filed Aug. 11, 1922

INVENTOR.
Charles F. Pym
By his Attorney,
Nelson W. Howard.

Patented July 5, 1927.

1,634,511

UNITED STATES PATENT OFFICE.

CHARLES F. PYM, OF LYNN, MASSACHUSETTS, ASSIGNOR TO UNITED SHOE MACHINERY CORPORATION, OF PATERSON, NEW JERSEY, A CORPORATION OF NEW JERSEY.

LASTING MACHINE.

Application filed August 11, 1922. Serial No. 581,170.

This invention relates to machines for use in lasting shoes, and is herein illustrated in its application to a lasting machine of the bed type, although it will be recognized that in many of its novel and useful features the invention is not limited to machines of that particular type.

Objects of the invention are to facilitate and expedite the lasting operation, while producing a uniformly excellent quality of work, and in one important aspect the invention has particularly in view improvements in respect to the fastening of the upper in lasted position. For the accomplishment of the above and other objects, a feature of the invention consists in a novel organization of end lasting mechanism, herein shown as toe lasting mechanism, and means for presenting to said mechanism a binder to be applied about the end of the shoe to hold the upper in lasted position. In the illustrated embodiment of the invention the means for presenting the binder comprises a portable holder or carrier provided with a device for delivering the binder in position to be operated upon by the binder applying means, the lasting mechanism and the carrier having cooperating elements for positioning the carrier in exact relation to the lasting mechanism for the delivery of the binder. In the type of machine illustrated, for example, the operator is thus enabled to effect a quick and accurate presentation of a binder to the lasting mechanism prior to the operation of the mechanism on a shoe.

For the further accomplishment of the objects in view, a feature of the invention consists in a novel organization of means for forming a binder and means for transferring the binder from the forming means to the lasting means. In its embodiment of this feature, the machine herein shown is provided with power-operated binder forming mechanism from which the binder is transferred to the lasting mechanism by the above mentioned portable carrier, the forming mechanism having means for supporting the carrier in predetermined relation thereto to receive the binder and having an automatically determined cycle of operations to form a binder and to deliver it to the carrier. It is a further characteristic of the construction illustrated that the binder forming mechanism is started in operation by the presentation of the carrier in binder receiving position, thus insuring that after a binder has been transferred and the carrier returned to the forming mechanism another binder will be prepared and delivered to the carrier ready for the lasting of the next shoe. The machine herein shown is constructed to form and utilize binders provided with angled ends to be forced into the shoe, and thus embodies many of the features described and claimed in Letters Patent No. 1,436,194, granted on Nov. 21, 1922, and No. 1,516,499, granted on Nov. 25, 1924, both upon my applications, as well as some features of Letters Patent No. 1,482,409, granted on Feb. 5, 1924 upon a joint application of myself and Arthur F. Pym.

A further feature of the invention consists in a novel construction and arrangement of wipers and binder applying means, with means for positioning a binder in such manner as to insure that its intermediate portion will be retracted outwardly from the shoe beyond the edges of the wipers. Such an arrangement presents important advantages in an organization wherein the wipers are utilized to wipe the upper heightwise of the toe, as herein shown, to insure against displacement or bending of the binder by engagement with the end face of the shoe. In the construction illustrated yieldable pins are provided for engaging the angled ends of the binder in such relation to the wipers as to position the binder as above set forth, and the binder is delivered in position to be held by the pins by the action of the delivering means on the binder carrier.

Another feature of the invention consists in a novel organization of wipers and binder applying means constructed to impart to the binder a bodily movement lengthwise of the shoe relatively to the wipers in the operation of applying the binder to the shoe. The construction shown comprises binder applying members or plates movable along the overwiping faces of the wipers to apply about the toe a binder provided with angled ends and to force its ends into the shoe, with guiding means constructed to insure movement of each plate in a predetermined path, including a component of bodily movement, or movement of translation, lengthwise of the shoe, and a component of rotary or swinging movement inwardly toward the side of the shoe. It is a further advantageous characteristic of the construction herein illustrated that at the beginning of the operation of the binder applying members the component of forward translatory movement predominates, whereby a quick bodily forward movement of the binder is effected to bring it into holding engagement with the upper at the end of the toe, and then decreases as the inward swinging movement of the plates continues for bending the binder toward the sides of the toe and forcing its ends into the shoe. It will be understood that the provision of means for imparting to the binder a bodily forward movement relatively to the wipers in applying it to the shoe permits the binder to be positioned with its intermediate portion retracted from the edges of the wipers in the operation of the wipers on the shoe, as hereinabove described, and that this is an important advantage, among others, of binder applying means of this character.

Still another feature of the invention consists of novel means for effecting a relative pressure relaxing movement between the wipers and the shoe after the overwiping operation. In its embodiment of this feature the machine illustrated is provided with novel means having an automatically limited movement to enable the operator to relax the downward pressure of the wipers upon the shoe to a predetermined extent before operating the binder applying means to force the binder in between the wipers and the shoe. This not only facilitates the operation of forcing the binder inwardly, but also serves to avoid any danger of injury to the surface of the upper by the inward movement of the ends of the binder. The provision of means for insuring a definite limit for the relative pressure relaxing movement of the wipers and the shoe avoids the possibility of unduly relaxing the pressure and relieves the operator of the exercise of that care which would otherwise be required to insure against partial loss of control of the upper.

The above and other features of the invention, including also novel wiper operating and controlling mechanism, a novel wiper unit, novel operating mechanism for the binder applying members, novel details of the binder forming mechanism, and other details of construction and combinations of parts, will now be more particularly described by reference to the accompanying drawings and pointed out in the claims.

In the drawings:

Fig. 1 shows in front elevation a bed lasting machine in which the invention is embodied;

Fig. 2 is a plan view of a portion of the toe lasting mechanism, with a part of the structure broken away;

Fig. 3 is a section on the line 3—3 of Fig. 2;

Fig. 4 is a section on the line 4—4 of Fig. 2;

Fig. 5 is a plan view on a smaller scale than Fig. 2 of the toe lasting mechanism and its associated holddown;

Fig. 6 is a plan view of the toe wipers, showing in dotted lines the associated mechanism for applying the binder to the shoe in the position which this mechanism assumes at an intermediate stage in its operative movement;

Fig. 7 is a view similar to the right-hand half of Fig. 6, with the wiper plate partly broken away, showing the binder applying mechanism in starting position;

Fig. 8 is a perspective view of the binder forming mechanism with the binder transferring device or carrier in position to receive a binder;

Fig. 11 is a section on the line 11—11 of Fig. 9 showing also parts which are at a higher elevation than the plan of Fig. 9;

Fig. 13 is a vertical section, substantially central, through the portable binder carrier;

Fig. 14 shows the portable carrier partly in plan and partly in horizontal section;

Fig. 15 is a section on the line 15—15 of Fig. 13;

Fig. 16 is a section through the binder delivering device on the line 16—16 of Fig. 14;

Fig. 19 is a vertical section illustrating the operation of the means for effecting relative pressure relaxing movement between the toe wipers and the shoe, and Fig. 20 is a view similar to Fig. 4 illustrating a modification.

Figure 9:
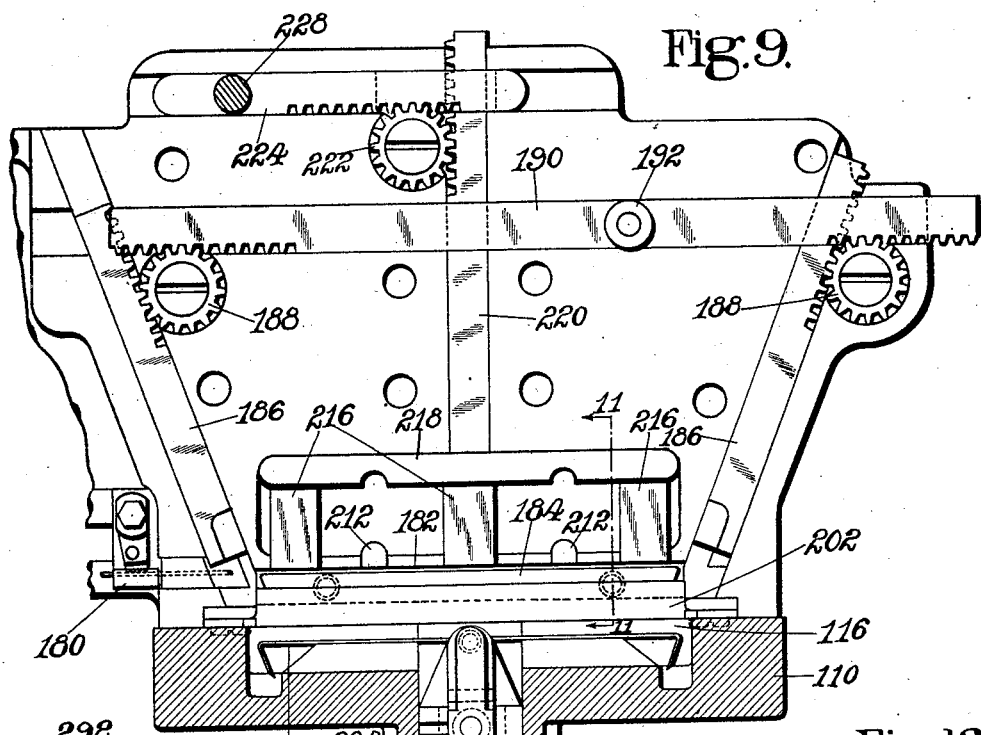
Fig. 9 is a plan view of a portion of the binder forming mechanism with the top part of the structure removed and with a part of the portable carrier shown in section.

The invention is herein shown, by way of illustration, in its application to a well-known type of bed lasting machine characteristic features of which are shown and described in various prior United States Letters Patent including Patent No. 1,018,477, granted on Feb. 27, 1912, upon an application of Matthias Brock, to which reference may be made for further description of such details of construction as are not hereinafter particularly described.

Machines of this type include heel last ing mechanism and toe lasting mechanism with means for supporting a shoe between these mechanisms, the supporting means comprising a heel pin 2 and a toe rest 4. Prior to the lasting operation a holddown 6 is swung forwardly and downwardly over the forepart of the shoe and is depressed by a treadle 8 to hold the shoe firmly upon the toe rest. For a better understanding of the holddown mechanism herein shown reference may be made to Letters Patent No. 1,373,482 granted on April 5, 1921 upon an application of Matthias Brock.

The toe lasting mechanism, with which the present invention is particularly concerned, is in many of its features similar to prior constructions of the above mentioned type, and comprises a wiper head which is adjustable in various ways lengthwise and laterally of the shoe, with provision for tipping movements to position the wipers substantially parallel to the plane of the forepart of the shoe bottom. The wiper head is carried by a support 10 which is guided for vertical movements in the frame of the machine and is connected by a link 12 to a treadle 14 whereby the wipers are raised to wipe the upper heightwise of the toe and are subsequently depressed to bring increased pressure to bear on the upper materials on the bottom of the shoe.

In the construction shown the wiper head (Figs. 2 and 3) comprises a lower plate 16 which is fast on a cylindrical member 18 mounted to turn in a bearing 20 for adjustably tipping the wipers laterally of the shoe, the member 18 being held from forward movement toward the shoe in substantially the same manner as in prior machines. Slidably mounted on the plate 16 for movements lengthwise of the shoe is a wiper carrier comprising a plate 22 on the opposite sides of which are secured retaining plates 24 which extend downwardly and inwardly under the normally stationary plate 16 to hold the wiper carrier in place and to guide it along the plate 16. Secured on the top of the carrier plate 22 to move with it lengthwise of the shoe is a cover plate 26. The carrier plate 22 is recessed to receive and guide a pair of gear segments 28 to which are detachably secured toe wiper plates 30 and their associated binder applying devices, as hereinafter more particularly described. The gear segments 28 are movable in their guideways about an axis located substantially where the wiping edges of the plates 30 meet at the end of the toe. Engaging the teeth of the gear segments are gear sectors 32 mounted in bearings in the plate 22 and rigidly connected to lower gear sectors 34 which are mounted in longitudinal recesses in the plate 16 and are in engagement with rack bars 36 slidably mounted in the plate 16. The plate 16 is provided with recesses 38 against the inner end walls of which collars 40 fast on the rack bars 36 are arranged to abut, and between these collars and thimbles 42 encircling the outer ends of the rack bars are compression springs 44. The thimbles 42 have flanged inner ends which abut against the ends of hollow adjusting screws 46 threaded in plates 48 which are secured to the plate 16. It will be evident that adjustment of the screws 46 serves to vary the resistance of the springs 44 to forward movement of the rack bars.

Forward movement is imparted to the wiper carrier 22 by mechanism similar to the wiper operating connections of prior machines, comprising a rod 50 which slides in the cylindrical member 18 and is connected at its inner end to the wiper carrier, and a hand lever 52 connected to the outer end of the rod and having manually controlled brake mechanism 54 (Fig. 5) associated therewith to hold the wipers, when the operator so desires, against retractive movement. As the wiper carrier is moved forwardly to advance the wipers lengthwise of the shoe the rack bars 36 are held normally stationary by the action of the springs 44, and the gear sectors 34 and 32 are accordingly operated by the rack bars to swing the gear segments 28 and their supported wipers inwardly toward and over the sides of the toe. In the event of substantially greater resistance to the closing movement of one of the wipers than to the closing movement of the other, the spring 44 associated with the wiper which encounters the greater resistance may yield, permitting the rack bar 36 to move forwardly without further closing movement of the wiper while the other wiper continues its closing movement. This manner of control, which is broadly similar to that of the construction shown in Patent No. 1,436,194, causes the wipers to adjust themselves to the shape of the toe, and it may be to the different contours of right and left toes, which in the construction herein shown is an advantage both for the upwiping operation and the overwiping operation. It will be evident that by varying the resistance of the springs 44 to forward movement of the rack bars 36 a variation may be effected in the pressure applied by the wipers at the sides of the toe as compared with the pressure at the end of the toe.

As a further provision for dealing with right and left shoes the machine herein shown is provided with additional adjusting members 56 which are seated within the thimbles 42 and are threaded on the ends of the rack bars 36. It will be evident that each of these members may be turned independently of the other to force the associated thimble 42 away from the inner end of the screw 46, compressing the spring 44, and thus to provide for lost motion so that the associated rack bar 36 will move forward initially with the wiper carrier until the thimble engages again with the screw 46, thereby retarding the closing movement of one of the wipers while the other wiper, which will be the one that has farther to go in order to meet the side of the shoe, is beginning its closing movement. It will also be understood that by adjustment of both the members 56 the closing movements of both the wipers may be retarded relatively to their advancing movement, in case, for example, it should be desired to increase the pressure of the wipers at the end of the toe as compared with their pressure at the sides of the toe.

The gear segments 28 support detachably what may be termed the wiper unit, comprising, in addition to the wiper plates 30, underlying plates 58 having inner edge faces curved to conform substantially to the contour of the shoe about the toe and adapted to engage the lateral periphery of the toe to limit the advancing and closing movements of the wipers. The plates 58 are secured to the wiper plates 30 and have lugs which space them from the wiper plates throughout a portion of their area to provide a slideway for binder applying members or plates 60, the latter being also a part of the wiper unit. The gear segments 28 are shaped to underlie a substantial portion of the lower plates 58 and are provided with ears 62 which seat in recesses in the plates 30 and have holes that aline with corresponding holes in the plates 30 and 58 to receive locking pins 64. The means for controlling the pins 64 is similar to the construction shown in Patent No. 1,436,194, and comprises pins 66 secured to curved guide members 68 which are movable upwardly and downwardly in recesses in the cover plate 26, these guide members having arc-shaped guideways in which are mounted blocks fast on the upper ends of the pins 64 so that the latter may move with the wipers and may be withdrawn to release the wipers by upward movement of the pins 66. To assist in guiding the wipers and to hold the opposite halves of the wiper unit assembled when the unit is detached, a guide plate 70 is provided having a lower flange seated in an arc-shaped guideway 72 in the plates 30 and having a tongue and groove connection with said plates. The guide plate 70 carries a screw 74 having on its lower end a stud 76 which seats in recesses in the meeting edges of the plates 30 for normally centralizing the guide plate when the unit is detached. When the wiper unit is in the machine the guide plate 70 is centralized by a member 78 secured to the cover plate 26 and having a fork-shaped end to embrace the head of the screw 74. In order to assist in holding the opposite halves of the wiper unit against the resistance to their closing movements laterally of the shoe and to avoid any possibility of a cramping action between the wipers and the flange projection on the guide plate 70, the lower plates 58 are provided with pins 80 which seat in semi-circular recesses in the front edges of the underlying gear segments 28.

For the accomplishment of one of the objects of the invention, the binder applying plates 60, the inner edges of which are shaped in substantial conformity to the contour of the rib of the insole lengthwise of the edge of the shoe bottom, are each controlled by a pair of curved slides or guide blocks 82 and 84 (Figs. 6 and 7) which are mounted respectively in arc-shaped guideways 83 and 85 formed in the plate 58. The inner end portion of each plate 60, i. e., the end at the middle portion of the wiper unit, is connected to the slide 84 by a pivot stud 86, and the outer end portion of the plate is connected to the slide 82 by a pivot stud 88. The guideway 83 for the slide 82 is concave toward the edges of the wipers, and may be curved about a center, for example, substantially at the point where the shoe engaging edges of the wipers meet at the center of the toe, while the guideway 85 for the slide 84 is convex toward the edges of the wipers and nearer to said edges than the other guideway, curving outwardly toward the latter guideway. On their outer ends the plates 60 have projections 90 which are engaged as hereinafter described to impart operative movement to the plates. Springs 92 connected to the slides 82 normally hold these slides and the connected plates 60 at their outer limits of movement determined by the engagement of the slides 82 with pins 94. It will be observed that when the plates 60 are thus at their outer limits of movement their binder engaging edges are retracted a considerable distance from the edges of the wipers 30 at the end as well as at the sides of the toe, which, as hereinafter explained, permits the formed toe binder $a$ to be positioned sufficiently remote from the edges of the wipers to avoid any danger of displacing it or of bending it by contact with the shoe, or of damaging the shoe, particularly in the upwiping operation of the wipers. It will be understood that with the plates 60 thus mounted and controlled each plate has, in operation, a component of movement of translation lengthwise of the shoe and simultaneously a component of movement of rotation whereby it is swung inwardly toward the side of the toe. At the beginning of the binder applying operation the greater component of movement of the plate is the movement of translation, whereby the binder is forced bodily forward against the upper materials at the end of the toe while it is being bent inwardly toward the sides of the toe. By reason, however, of the manner in which the guideway 85 for the slide 84 is curved outwardly, the component of forward translatory movement of the plate 60 decrease as the binder applying operation progresses, so that by the time the inturned ends of the binder are ready to enter the shoe materials the plates 60 have only a slight bodily forward movement as compared with their swinging movement, the slight forward movement serving still further to tighten the binder about the end of the toe as its ends are forced into the shoe. In the final portion of the movement of the plates 60, by which the ends of the binder are forced inwardly through the upper materials and into the rib of the insole, the binder engaging edges of the plates are advanced into substantially parallel relation to the upper engaging edges of the wipers.

Operative movement is imparted to the plates 60 by rack bars 96 slidably mounted in guideways in the cover plate 26 and engaged by pinions 98 which are in turn engaged by rack bars 100 provided with cylindrical extensions slidably mounted in the member 18 and pivoted at their outer ends to an equalizer bar 102 (Fig. 5). The equalizer 102 is pivoted centrally upon a bushing 104 slidably mounted on the wiper operating rod 50 and connected by a link 106 to a hand lever 108. It will be understood that by movement of the lever 108 toward the right (Fig. 1) the rack bars 96 are operated through the connections described to engage the projections 90 on the plates 60 and to impart binder applying movement to the plates, the equalizer 102 permitting such differential movement of the rack bars as to apply substantially equal pressures to the binder at the opposite sides of the toe. It will be understood that when the wipers are advanced and closed the pinions 98 are moved forwardly with the wiper carrier and may be turned by the action of the rack bars 100 held stationary by the friction of the operating connections. In this way inward movement is imparted to the rack bars 96 to carry them toward the projections 90 on the plates 60 as these plates are being swung inwardly by the wipers, so that in the subsequent operation of the hand lever 108 there is substantially no lost motion between the rack bars and the projections 90.

The means for transferring toe binders from the binder forming mechanism (hereinafter described) to the wipers comprises a portable binder carrier (Figs. 13 to 16) having movably mounted thereon a device for delivering the binder in position to be operated upon by the binder applying means. The carrier comprises a casting 110 shaped to provide an upright handle 112 whereby the operator moves the carrier from the forming mechanism to the wipers, and a plate 114 secured to the lower end of the casting, the members 110 and 114 being fitted together in such manner as to provide between them a horizontal slot 116 (Fig. 14) to receive the binder a. For positioning the binder carrier in exact relation to the wiper mechanism the cover plate 26 of the wiper carrier has adjustably secured thereto wedge blocks 118 (Figs. 17 and 18) which are arranged to engage sloping faces 120 formed on lugs 122 on the casting 110, these lugs being also provided with laterally facing shoulders 124 for engagement with the inner sides of the wedge blocks 118 to position the carrier laterally of the wipers. By reference to Fig. 18 it will be seen that the lugs 122 on the binder carrier are arranged to slide inwardly over the top faces of the wipers 30 and are so disposed as to aline the slot 116 in the binder carrier with the binder receiving opening between the wipers 30 and the underlying plates 58. The operator presents the binder carrier in proper relation to the wipers and to the wedge blocks 118 and then slides it inwardly into substantially abutting relation to the ends of the wipers, the wedge blocks 118 being so adjusted that when the carrier is in that relation to the wipers the wedge blocks engage the sloping top faces 120 of the lugs 122 to insure alinement of the binder with the binder receiving opening of the wiper mechanism.

Figure 17:
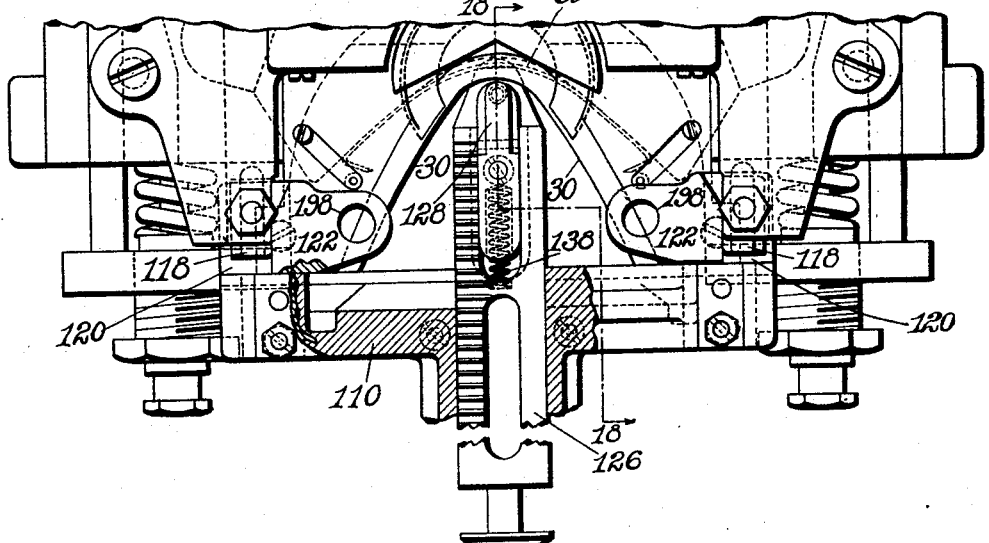
Fig. 17 is a plan view of a portion of the toe lasting mechanism with the binder carrier shown partly in plan and partly in section in the act of delivering a binder.

For delivering the binder from the binder carrier and presenting it in position to be operated upon by the binder applying means the carrier is provided with a slide 126 the front end portion of which is recessed to receive a second slide 128 and is formed with a notch 130 to receive the binder a midway between the opposite ends of the binder. The front end of the slide 126 is adapted to serve as one of the jaws of a gripper in co-operation with a jaw 132 which is pivoted at 134 on the slide 128 and is pressed downwardly by a spring 136 to grip the binder in the notch 130 of the main slide 126. A spring 138 serves to hold the slide 128 at a forward limit of movement relatively to the slide 126 determined by engagement of a screw 140 on the slide 128 with the front end wall of a slot 142 formed in the slide 126. The slide 126 is normally maintained in retracted position, as shown in Figs. 13 and 14, by spring-controlled rack and pinion mechanism, comprising a pinion 144 engaging rack teeth formed on the slide 126, a pinion 146 fast on the pinion 144 and engaging rack teeth formed on a slide 148 which is vertically movable in the handle member 112, and a spring 150 which holds the slide 148 upwardly against a stop 152. To impart forward movement to the slide 126 against the resistance of the spring 150 the operator pushes with his hand against a knob 154 on the outer end of the slide. By such movement of the slide the binder is carried out of the slot 116 and into the opening in front of the driver plates 60, and the angled ends of the binder are carried past retaining pins 156 which are pressed downwardly through openings in the wipers 30 by spring plates 158 substantially as illustrated by Patent No. 1,516,499. In order to insure that the intermediate portion of the binder will be positioned well back of the edges of the wipers 30 to avoid danger of its displacement in the upwiping operation, the slide 126 is moved forwardly far enough to carry its notch 130 and the intermediate portion of the binder under the wiper plates beyond the wiper edges, as illustrated in Fig. 17. Means is provided, however, for limiting the forward movement of the slide 128 and its gripper jaw 132, so that in the latter portion of the transferring operation the slide 126 moves relatively to the slide 128 and the binder is carried away from the jaw 132. This means comprises a slide 160 having an opening 162 to receive the head of the screw 140 and provided on its outer end with a downturned lug which carries a screw 164 in position for engagement with an abutment 166 on the lower plate 114. The slide 160 is moved forwardly with the slide 126 by the action of the screw 140 until the screw 164 engages the abutment 166, and then the slide 160 and the slide 128 are held back while the slide 126 continues its forward movement. When the operator releases the knob 154 the spring 150 returns the parts of the binder delivering device to starting position, leaving the binder in the opening in front of the plates 60. When the binder is released its resiliency causes its angled ends to engage the pins 156 which then act to centralize the binder in the wiper mechanism. These pins, as in my earlier application, are beveled on the sides toward the ends of the binder so that they will readily yield to the pressure of the binder when the plates 60 are operated to apply the binder to the shoe. In the present construction the pins are so located as to retain the binder with its intermediate portion retracted outwardly beyond the edges of the wipers. After transferring the binder the operator removes the binder carrier from the wiper mechanism and returns it to the forming mechanism to receive another binder.

The binder forming mechanism (Fig. 8) is in many features of its general organization similar to the forming mechanism shown and described in Patent No. 1,516,499. Conveniently this mechanism is supported upon a bracket on the rear portion of the frame of the lasting machine and is operated through a belt 168 from the usual power means provided for rotating the tack hopper. The wire $b$ from which the binders are made is fed from a reel through a rotatable straightening device 170 of any suitable well-known type, for example as shown in said prior patent, the feeding means comprising a reciprocating slide 172 operated by a lever 174 to which movement is imparted through connections not herein illustrated in detail from gearing 176 driven by a worm 178 on the wire straightening device. The wire is fed through a retaining clutch 180 and along a guideway 182 (Fig. 9) between a portion of the frame of the mechanism and an anvil plate 184. A section of wire of proper length for the binder is cut off by one of a pair of bending slides 186, and by the operation of these slides the ends of the section of wire are bent over the ends of the anvil plate 184 to form the prongs which are to be forced into the shoe. The slides 186 are operated through pinions 188 from a rack bar 190 provided with a roll 192 which is engaged and operated by a cam 194 on a cam shaft 196. After the slides 186 have received their operative movement they are retracted, and the binder is then delivered from the forming mechanism to the binder carrier.

To position the binder carrier in proper relation to the forming mechanism to receive the binder, the lugs 122 on the carrier are provided with holes 198 to receive pins 200 (Fig. 8) which are fast on the frame of the forming mechanism, an interlocking connection thus being provided. When the carrier is in this position its binder receiving slot 116 is on a level with the top face of a ledge 202 which is in the same plane as the binder at the back of the anvil 184 (Fig. 11). Before the binder is transferred to the binder carrier the anvil 184 is depressed to release it, depression of the anvil being effected by the action of spring plungers 204 which are carried by arms 206 (Fig. 8) forming part of a bell-crank member, the other arm 208 of which is operated by a cam 210 on the cam shaft 196. The plungers 204 engage ears 212 which are fast on the anvil member 184, and force the anvil downwardly against the resistance of springs 214, the downward movement of the anvil being limited by the engagement of the ears 212 with the bottom of the recesses in the frame in which they are mounted. When the anvil member is in its depressed position its upper edge is on a level with the top face of the ledge 202 to provide a continuous smooth slideway for the binder. The binder is delivered to the carrier by an ejector comprising three plates 216 which project forwardly from a cross bar 218, the latter being moved forwardly by a slide 220 to which movement is imparted through a pinion 222 and a rack bar 224 from a cam 226 on the cam shaft 196, the cam operating a lever 227 which is connected to a pin 228 on the rack bar. The three plates 216, engaging the binder centrally and at its opposite ends, prevent it from turning as it is moved forwardly, and the middle plate wedges the binder into the notch 130 of the slide 126 where it is held by the spring-pressed jaw 132. The ejector is then retracted and the anvil 184 is raised into position to act as a guide in the next feeding movement of the wire.

Figures 10, 12:
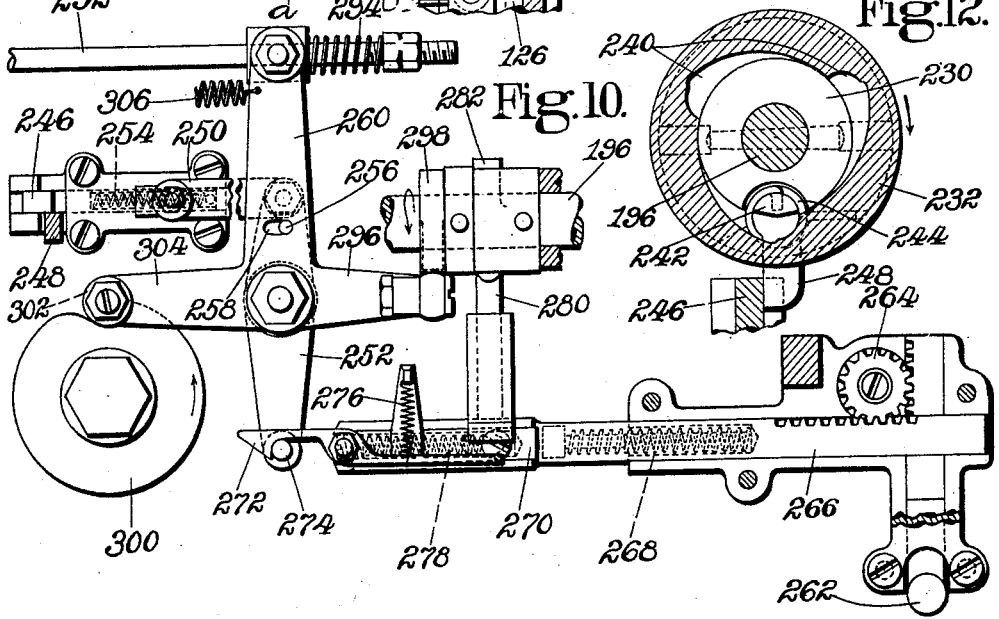
Fig. 10 is a plan view of a portion of the binder forming mechanism positioned at a higher elevation than the portion shown in Fig. 9, with parts broken away.
Fig. 12 is a vertical section illustrating the construction of one of the clutches of the binder forming mechanism.

In the construction herein shown the cycle of operations of the binder forming mechanism, for the purpose of obtaining a quick delivery of a binder to the carrier, comprises the forming of a binder from wire fed into operative relation to the anvil plate in a previous operation of the mechanism and the delivery of the binder to the carrier, and thereafter the feeding of the wire into position for the forming of a binder in the next operation of the mechanism. For the purposes in view operative movement is accordingly imparted first to the cam shaft 196 while the wire straightening and feeding devices are at rest. For controlling the shaft 196 a clutch is provided which may conveniently comprise, as shown in Figs. 8 and 12, an inner member 230 fast on the shaft 196 and an outer member 232 which is rotated continuously through spiral gearing 234 and beveled gearing 236 by a belt pulley 238 driven by the belt 168 (Fig. 1). The outer member 232 is provided with a plurality of recesses 240, shown as three, into one or another of which a pin 242 carried by the inner member may project to cause the inner member to be rotated. Prior to the starting operation the pin 242 is held against the resistance of its spring 244 in a position permitting the outer member to rotate freely without turning the inner member, the pin being held in this position by a stop 246 in engagement with a finger 248 projecting downwardly from the pin. The stop 246 is formed on a slide which is connected by a link 250 (Fig. 10) to a lever 252. A spring 254 normally holds the stop 246 in the position illustrated, to disconnect the shaft 196 from the source of power, movement of the stop under the influence of the spring being limited by a pin 256 carried by the lever 252 and projecting into a slot 258 formed in another lever 260 the function of which will be hereinafter described.

The stop 246 is moved into position to release the finger 248 and thus to start the operative movement of the shaft 196 by the action of presenting the binder carrier in binder receiving position on the forming mechanism. For this purpose a plunger 262 (Fig. 10) is arranged to be pressed inwardly by the binder carrier, this plunger having rack teeth engaging a pinion 264 whereby movement toward the right (Fig. 10) is imparted to a rack slide 266 against the resistance of a spring 268. The slide 266 carries a slide 270 on which is pivotally mounted a hook 272 engaging a pin 274 on the lever 252. A spring 276 normally holds the hook 272 in engagement with the pin 274. A spring 278 affords provision for relative yield between the slides 266 and 270 in the operative movement of the slide 266. It will thus be seen that when the plunger 262 is pressed rearwardly by the binder carrier when the operator places the carrier in position to receive a binder, it causes the hook 272 to swing the lever 252 and thereby to slide the stop 246 toward the left (Fig. 10) to release the finger 248. The clutch is thereby rendered effective to impart movement to the cam shaft 196, and the devices for severing a section of wire and for bending its ends, for depressing the anvil and for delivering the binder to the binder carrier are operated as hereinbefore described. In order to bring the cam shaft 196 to a stop at the end of a single revolution the hook 272 is swung into position to release the pin 274 by the action of a spring-controlled plunger 280 to which movement is imparted by a cam 282 on the shaft 196. The hook is thus disconnected from the pin shortly before the cam shaft arrives at the end of its revolution, and the spring 254 then acts to move the stop 246 into position to engage the finger 248 as soon as the finger comes round to the position from which it started.

The wire straightening and feeding devices are controlled through another clutch which is actuated automatically to start these devices before the cam shaft 196 comes to a stop. The second clutch comprises a cone shaped member 284 fast on the pulley 238 and arranged to co-operate with another member secured to a gear wheel 286 which meshes with a gear 288 on the wire straightening device. The clutch member 284 is controlled by a forked slide 290 connected through a link 292 and a spring 294 (Fig. 10) to the lever 260. This lever has an arm 296 which is operated upon by a cam 298 on the cam shaft 196. It will be readily understood that when the lever 260 is swung toward the right (Fig. 10) the second clutch is actuated to connect the wire straightening device and the feeding device to the source of power. Fast on the gear 176 is a controlling disk 300 provided with a recess to receive a roll 302 on an arm 304 which is fast on the lever 260. When the second clutch is actuated the roll 302 is swung out of the recess in the disk 300, and since the disk is turned by the mechanism which is driven by the clutch it immediately moves into position to hold the lever 260 in clutching position. The required operations of the straightening and feeding devices are not completed until the disk 300 arrives at the end of its revolution, and at this point the roll 302 is permitted to drop again into the recess in the disk, a spring 306 acting on the lever 260 to release the clutch. The wire may thus be fed into position for forming the next binder while the binder carrier is still mounted on the forming mechanism and holds the binder which has been already delivered to it or after the carrier with its binder has been removed. When the carrier is removed from the forming mechanism to carry the binder to the wipers, the spring 268 acts on the slide 266 to connect the hook 272 again to the pin 274 and to advance the plunger 262 into position to be engaged by the binder carrier when the latter is returned to the forming mechanism.

As hereinbefore explained, in the operation of machines of the type illustrated, it is the practice for the operator, after wiping the marginal portion of the upper inwardly, for example on a welt shoe into the angle between the feather and the rib of the insole, to depress the wiper head by the use of the treadle 14 for the purpose of pressing the upper firmly down upon the insole. In order to make it easier to operate the binder applying plates 60, which must be forced in between the wipers and the upper materials, and to insure against forming abrasions on the surface of the upper by the inward movement of the angled ends of the binder, the machine is provided with means for effecting a slight relative movement heightwise of the shoe between the wipers and the shoe to relax the pressure of the wipers on that portion of the upper which overlies the feather of the insole, as illustrated in Fig. 19. For this purpose there is pivoted to the side plates 24 of the wiper carrier a holder 308 in which is mounted a plunger 310 having on its lower end a member 312 which is shaped to seat in a recess formed in the holddown 6. Pivoted on the holder 308 at the upper end of the plunger 310 is an eccentric 314 provided with a handle 316 which may be swung by the operator to force the plunger 310 downwardly against the resistance of a spring 318. Since the forepart of the shoe is supported on the toe rest 4, the principal effect of the eccentric 314 on the plunger 310 is to impart a slight upward movement to the wiper head. The handle 316 in its idle position is supported by spring plates 320, and from this position it is swung by the operator as far as permitted by a stop screw 322, so as to insure the same relative movement of the shoe and the wipers in operating on different shoes. This relative movement may be varied by adjusting the member 312 upwardly or downwardly on the plunger 310, as permitted by the threaded connection provided. It will be understood that while the operation of this device serves to relax the downward pressure of the wipers on the shoe, the relative movement of the shoe and the wipers is not sufficient to detract from the quality of the lasting. Moreover, the plates 60 as they are moved inwardly act as auxiliary wipers to assist in defining a sharp angle in the upper materials at the base of the insole rib. By reference to Figs. 1 and 5 it will be seen that normally the holder 308 is tipped backwardly over the wiper carrier in an out of the way position by a spring 323, and after the overwiping operation is completed the operator swings it to a substantially upright position over the bottom of the shoe and then moves the member 312 downwardly into the recess in the holddown and performs the pressure relaxing operation as described.

As an alternative to the use of the pressure relaxing device the construction shown in Fig. 20 may be utilized. In this construction the lower plates 58$^a$, corresponding to the plates 58 of the previously described construction, act as the wipers, having on their inner edges thin projections 58$^b$ for wiping the upper inwardly over the feather of the insole and along which the binder is forced inwardly by the plates 60, the members 30$^a$ of this construction, corresponding to the wipers 30 of the other construction, cooperating with the wipers 58$^a$ to provide a guideway for the binder along the outer faces of the wipers. It will be seen that by the use of this construction the upper is effectually guarded against any injury through contact with the ends of the binder, and since the projections 58$^b$ are comparatively thin and the upper may be held with as heavy a downward pressure as is desired at the time when the binder is applied to the shoe, the binder is applied sufficiently close to the base of the insole rib for satisfactory results in the lasting of the shoe.

Figure 18:
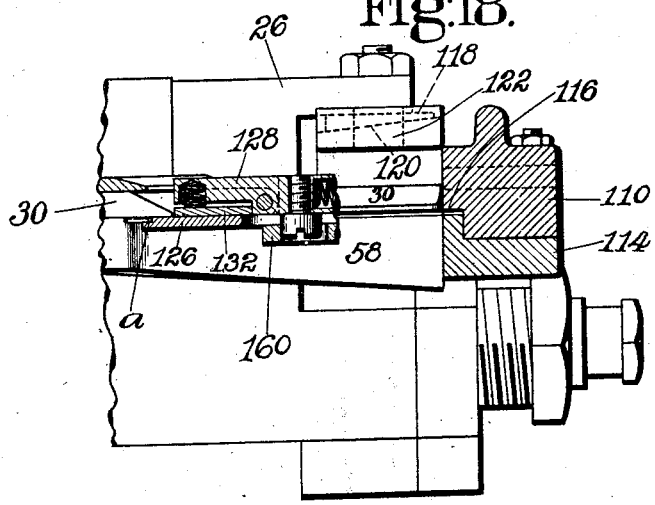
Fig. 18 is a section on the line 18—18 of Fig. 17.

In the operation of the machine, briefly summarized, the operator first takes from the binder forming mechanism the binder carrier to which a formed toe binder has already been delivered and presents the carrier to the wiper mechanism in the position illustrated in Figs. 17 and 18, and then by manipulation of the binder delivering device forces the binder into place in front of the plates 60. He then returns the binder carrier to the forming mechanism, and in placing it in position to receive another binder starts that mechanism in operation. Thereafter he mounts a shoe on the heel pin 2 and the toe rest 4, applies the holddown to the shoe, and performs the lasting operation at the heel end of the shoe in the usual well-known manner. He then advances and closes the wipers about the toe of the shoe by the use of the hand lever 52, and wipes the upper upwardly about the toe by the use of the treadle 14, further manipulating the lever 52 and the treadle to wipe the upper inwardly over the insole and to press it down upon the feather of the insole. Thereafter he manipulates the pressure relaxing device (Fig. 19) to relax the downward pressure of the wipers upon the shoe, and by movement of the hand lever 108 imparts forward and inward movements to the plates 60 to apply the binder about the toe and to force its ends into the opposite side portions of the shoe materials. The different parts of the lasting mechanism, including the pressure relaxing device, are then returned to their starting positions and the shoe is removed from the machine.

Having described the invention, what I claim as new and desire to secure by Letters Patent of the United States is:

1. In a machine of the class described, the combination with end lasting mechanism having means for applying a binder about an end of a shoe to hold the upper in lasted position, of mechanism for forming a binder for use on a shoe, and a binder transferring device constructed to receive a binder from the forming mechanism and adapted to be controlled by the operator independently of the lasting mechanism to transfer the binder from said forming mechanism to the lasting mechanism.

2. In a machine of the class described, the combination with end lasting mechanism having means for applying a binder about an end of a shoe to hold the upper in lasted position, of mechanism for forming a binder for use on a shoe, and a portable carrier having means for holding a binder in predetermined position thereon and adapted to be utilized by the operator to carry the binder from the forming mechanism to the lasting mechanism.

3. In a machine of the class described, the combination with end lasting mechanism having means for applying a binder about an end of a shoe to hold the upper in lasted position, of mechanism for forming a binder for use on a shoe, and a portable binder transferring device having means for positioning it in predetermined relation to said binder forming mechanism to receive a binder and movable by the operator to present the binder to the lasting mechanism.

4. In a machine of the class described, the combination with end lasting mechanism having means for applying about an end of a shoe a binder provided with angled ends and for forcing said ends into the shoe, of binder forming mechanism having means for severing a section of wire and for bending its ends to form a binder, and a device constructed to receive the binder from the forming mechanism and manually movable at the will of the operator to carry the binder to the lasting mechanism.

5. In a machine of the class described, the combination with end lasting mechanism having means for applying a binder about an end of a shoe to hold the upper in lasted position, of mechanism for forming a binder for use on a shoe, a portable carrier for transferring a binder from said forming mechanism to the lasting mechanism, means cooperating with said carrier to position the carrier in predetermined relation to the forming mechanism to receive the binder, and means cooperating with the carrier to position it in predetermined relation to the lasting mechanism to deliver the binder.

6. In a machine of the class described, the combination with end lasting mechanism having means for applying a binder about an end of a shoe to hold the upper in lasted position, of mechanism for forming a binder for use on a shoe, and a portable carrier constructed to receive a binder from the forming mechanism and movable to transfer the binder to the lasting mechanism, said binder forming mechanism and carrier having thereon members constructed to interlock with each other to position the carrier in predetermined relation to the forming mechanism to receive the binder.

7. In a bed lasting machine, the combination with toe lasting mechanism having means for applying a binder about the toe, of binder forming and delivering mechanism operated independently of the lasting mechanism, and a portable carrier constructed to receive a binder thus delivered and adapted to be utilized by the operator to present the binder to the lasting mechanism, said carrier having means whereby it is supported in binder receiving position when not in use by the operator.

8. In a bed lasting machine, the combination with manually operated toe lasting mechanism having means for applying a binder about the toe, of power-driven binder forming mechanism, and a device constructed to receive a binder from said forming mechanism and movable to present the binder to the lasting mechanism.

9. In a machine of the class described, the combination with toe lasting mechanism having means for applying a binder about the toe, of a portable carrier for presenting a binder to the lasting mechanism, means for supporting said carrier in binder receiving position, and mechanism automatically operative when the carrier is in such position to form a binder and to deliver it to the carrier.

10. In a machine of the class described, the combination with end lasting mechanism having means for applying a binder about an end of a shoe to hold the upper in lasted position, of mechanism for forming a binder for use on a shoe, a portable carrier for transferring a binder from the forming mechanism to the lasting mechanism, and means for delivering the binder from the forming mechanism to said carrier 11. In a machine of the class described, the combination with end lasting mechanism having means for applying a binder about an end of a shoe to hold the upper in lasted position, of mechanism for forming a binder for use on a shoe, a carrier for transferring a binder from the forming mechanism to the lasting mechanism, and means automatically operative in response to presentation of said carrier to the forming mechanism to deliver a binder from said mechanism to the carrier.

12. In a machine of the class described, the combination with end lasting mechanism having means for applying a binder about an end of a shoe to hold the upper in lasted position, of a carrier movable from a binder receiving position into position to present a binder to said lasting mechanism, and mechanism automatically operative in response to presentation of said carrier in binder receiving position to deliver a binder to said carrier.

13. In a machine of the class described, the combination with end lasting mechanism having means for applying a binder about an end of a shoe to hold the upper in lasted position, of a carrier movable from a binder receiving position into position to present a binder to said lasting mechanism, said carrier having a gripper to receive and hold the binder, and means for delivering a binder in position to be held by said gripper while said carrier is in binder receiving position.

14. In a machine of the class described, the combination with end lasting mechanism having means for applying a binder about an end of a shoe to hold the upper in lasted position, of mechanism for forming a binder for use on a shoe, a carrier movable to carry a binder from said forming mechanism to the lasting mechanism, said carrier having a gripper to receive and hold the binder, and means for delivering a binder from the forming mechanism to said carrier and for forcing the binder into said gripper.

15. In a machine of the class described, the combination with end lasting mechanism having means for applying a binder about an end of a shoe to hold the upper in lasted position, of mechanism for forming a binder for use on a shoe, a carrier movable to carry a binder from said forming mechanism to the lasting mechanism, said carrier having a gripper provided with jaws normally closed for holding the binder yieldingly, and an ejector associated with said forming mechanism and having a member for forcing the binder into position between said jaws.

16. In a machine of the class described, the combination with end lasting mechanism having means for applying a binder about an end of a shoe to hold the upper in lasted position, of mechanism for forming a binder for use on a shoe, a carrier movable to carry a binder form said forming mechanism to the lasting mechanism, said carrier having a gripper for gripping and holding the binder substantially midway between its opposite ends, and an ejector for delivering the binder to said carier having means for engaging the opposite end portions of the binder and also means for engaging it substantially midway between its opposite ends to force it into said gripper.

17. In a machine of the class described, the combination with end lasting mechanism having means for applying a binder about an end of a shoe to hold the upper in lasted position, of a carrier movable from a binder receiving position into position to present a binder to said lasting mechanism, and power-operated means controlled by said carrier for forming a binder and for delivering the binder to said carrier in its binder receiving position.

18. In a machine of the class described, the combination with end lasting mechanism having means for applying a binder about an end of a shoe to hold the upper in lasted position, of power-operated mechanism for forming a binder for use on a shoe, and a carrier for transferring a binder from the forming mechanism to the lasting mechanism, said binder forming mechanism having starting means arranged to be operated to start said mechanism by the presentation of said carried in binder receiving position.

19. In a machine of the class described, the combination with end lasting mechanism having means for applying a binder about an end of a shoe to hold the upper in lasted position, of power-operated binder forming and delivering mechanism, and means for transferring a binder from said last-named mechanism to the lasting mechanism, said binder forming and delivering mechanism having an automatically determined cycle of operations first to form a binder and deliver it to the transferring means and then to feed binder material into position for forming another binder when said mechanism is again started.

20. In a machine of the class described, the combination with end lasting mechanism having means for applying a binder about an end of a shoe to hold the upper in lasted position, of power-operated binder forming and delivering mechanism, and a portable carrier adapted to be supported in position to receive a binder from said last-named mechanism and to be moved by the operator to carry the binder to the lasting mechanism, said binder forming and delivering mechanism having starting means controlled by said carrier and means for bringing it automatically to a stop to cause it to remain at rest until the carrier has been returned to binder receiving position after transferring its binder to the lasting mechanism.

21. In a machine of the class described, the combination with end lasting mechanism having means for applying a binder about an end of a shoe to hold the upper in lasted position, of power-operated binder forming and delivering mechanism, and a carrier movable to carry a binder from said last-named mechanism to the lasting mechanism, said binder forming and delivering mechanism comprising means for severing a section of wire and for bending its ends and delivering it to the carrier and also means for feeding wire into position for forming a binder, and automatic means for starting said wire feeding means in operation after the operation of said severing and bending means has been substantially completed.

22. In a machine of the class described, the combination with end lasting mechanism having means for applying a binder about an end of a shoe to hold the upper in lasted position, of power-operated binder forming mechanism comprising means for severing a section of wire and for bending its ends to form a binder and means for feeding wire into position to be operated upon by said severing and bending means, a carrier for transferring a binder from said forming mechanism to the lasting mechanism, a clutch for controlling said wire severing and bending means arranged to be actuated by said carrier, and a clutch for said feeding means automatically controlled to cause the feeding of the wire after the operation of said severing and bending means on a section of wire previously fed.

23. Mechanism for forming binders for use in lasting the toes of shoes comprising, in combination, means for feeding binder wire, means for severing a section of the wire and for bending its ends to form prongs adapted to be forced through the upper and into the insole of a shoe, and controlling mechanism having an automatically determined cycle of operations to cause said severing and bending means upon the starting of the mechanism to operate first upon wire previously fed and then to cause said feeding means to feed binder wire into position to be operated upon by the severing and bending means when the mechanism is again started.

24. Mechanism for forming binders for use in lasting the toes of shoes comprising, in combination, means for feeding binder wire, means for severing a section of the wire and for bending its ends to form prongs adapted to be forced through the upper and into the insole of a shoe, clutches arranged respectively to control said different means, means for actuating the clutch for the severing and bending means to start the operation of said means, and automatic means for thereafter actuating the clutch for the wire feeding means to start that means in operation.

25. In a machine of the class described, the combination with end lasting mechanism having means for applying a binder about an end of a shoe to hold the upper in lasted position, of mechanism for forming a binder for use on a shoe, and manually operated means for carrying a binder from the binder forming mechanism to the lasting mechanism and for delivering the binder to the lasting mechanism.

26. In a machine of the class described, the combination with end lasting mechanism having means for applying a binder about an end of a shoe to hold the upper in lasted position, of mechanism for forming a binder for use on a shoe, and a carrier arranged to be controlled by the operator independently of the lasting mechanism to carry a binder from the forming mechanism to the lasting mechanism and provided with means for delivering the binder to the lasting mechanism.

27. In a machine of the class described, the combination with end lasting mechanism having means for applying a binder about an end of a shoe to hold the upper in lasted position, of mechanism for forming a binder for use on a shoe, and a carrier movable to carry a binder from said forming mechanism to the lasting mechanism, said carrier having a device movably mounted thereon for delivering the binder in position to be operated upon by the binder applying means.

28. In a machine of the class described, the combination with end lasting mechanism having means for applying a binder about an end of a shoe to hold the upper in lasted position, of mechanism for forming a binder for use on a shoe, and a portable carrier for transferring a binder from the forming mechanism to the lasting mechanism, said carrier having a gripper movably mounted thereon for delivering the binder in position to be operated upon by the binder applying means.

29. In a machine of the class described, the combination with end lasting mechanism having means for applying a binder about an end of a shoe to hold the upper in lasted position, of mechanism for forming a binder for use on a shoe, and a carrier for transferring a binder from the forming mechanism to the lasting mechanism, said carrier having a gripper arranged to receive the binder from the forming mechanism and movable to deliver the binder to the lasting mechanism.

30. In a machine of the class described, the combination with end lasting mechanism having means for applying a binder about an end of a shoe to hold the upper in lasted position, of a carrier movable to present a binder to said lasting mechanism, said carrier having movably mounted thereon a device for transferring the binder into position to be operated upon by the binder applying means.

31. In a machine of the class described, the combination with end lasting mechanism having means for applying a binder about an end of a shoe to hold the upper in lasted position, of a carrier for presenting a binder to said lasting mechanism, said carrier having a gripper for holding the binder and means enabling the operator to impart to said gripper movement to deliver the binder to the binder applying means.

32. In a machine of the class described, the combination with end lasting mechanism having means for applying a binder about an end of a shoe to hold the upper in lasted position, of a portable carrier for presenting a binder to said lasting mechanism, and means for guiding said carrier into predetermined relation to the lasting mechanism for the delivery of the binder.

33. In a machine of the class described, the combination with end lasting mechanism comprising end embracing wipers and means adjacent to said wipers for applying a binder about an end of a shoe, of a portable carrier for presenting a binder to said lasting mechanism, and means for engaging said carrier to position it laterally of the wipers for the delivery of its binder.

34. In a machine of the class described, the combination with end lasting mechanism comprising end embracing wipers and means movable relatively to said wipers for applying a binder about an end of a shoe, of a portable carrier for presenting a binder to said lasting mechanism, said carrier being constructed for engagement with the top and end faces of said wipers to position it in predetermined relation to said mechanism.

35. In a machine of the class described, the combination with end lasting mechanism comprising end embracing wipers and means movable relatively to said wipers for applying a binder about an end of a shoe, of a portable carrier for presenting a binder to said lasting mechanism, said carrier having projections arranged for positioning engagement with the top faces of the wipers, and means for engaging said projections to determine the position of the carrier laterally of the wipers.

36. In a machine of the class described, the combination with end lasting mechanism comprising end embracing wipers and means movable relatively to said wipers for applying a binder about an end of a shoe, of a carrier for presenting a binder to said lasting mechanism, said carrier having a gripper thereon arranged to engage the binder and movable to deliver the binder in position to be operated upon by said binder applying means.

37. In a machine of the class described, the combination with end lasting mechanism comprising end embracing wipers and means movable relatively to said wipers for applying a binder about an end of a shoe, of a carrier for presenting a binder to said lasting mechanism, said carrier having a member mounted thereon for engagement with the binder substantially midway between its opposite ends and movable to deliver the binder to the binder applying means.

38. In a machine of the class described, the combination with end lasting mechanism comprising end embracing wipers and means movable relatively to said wipers for applying a binder about an end of a shoe, of a carrier for presenting a binder to said lasting mechanism, said carrier having a binder delivering member movable lengthwise of the wipers to force the intermediate portion of the binder beyond the edges of the wipers.

39. In a machine of the class described, the combination with end lasting mechanism comprising end embracing wipers and means movable along the overwiping faces of said wipers for applying a binder about an end of a shoe, of a carrier for presenting a binder to said lasting mechanism, said carrier having a gripper movably mounted thereon for delivering the binder and comprising jaws one of which is movable relatively to the other to force the intermediate portion of the binder along the overwiping faces of the wipers beyond the edges of the wipers.

40. In a machine of the class described, the combination with end lasting mechanism comprising end embracing wipers and means movable along the overwiping faces of said wipers for applying a binder about an end of a shoe, of a carrier for presenting a binder to said lasting mechanism, said carrier having a gripper movably mounted thereon for delivering the binder and comprising relatively movable jaws for gripping the binder, and means for limiting the movement of one of said jaws while the movement of the other jaw continues for forcing the intermediate portion of the binder along the overwiping faces of the wipers beyond the edges of the wipers.

41. In a machine of the class described, the combination with end lasting mechanism comprising end embracing wipers and means movable relatively to said wipers for applying a binder about an end of a shoe, of a carrier for presenting a binder to said lasting mechanism, said carrier having thereon a slide provided with means for engaging the binder and adapted to be moved forwardly by the operator to force the binder into position to be operated upon by said binder applying means.

42. In a machine of the class described, the combination with end lasting mechanism comprising end embracing wipers and means movable along the overwiping faces of said wipers to apply a binder about an end of a shoe, of a carrier constructed to present a binder at the ends of the wipers, and a slide on said carrier having a notch to receive the intermediate portion of the binder and movable to force the binder along the overwiping faces of the wipers and to advance the intermediate portion of the binder beyond the edges of the wipers.

43. In a machine of the class described, the combination with end lasting mechanism comprising end embracing wipers and means movable relatively to said wipers for applying a binder about an end of a shoe, of means for presenting to said lasting mechanism a binder having angled ends comprising a device for engaging the binder and forcing it lengthwise of the wipers to position its intermediate portion beyond the edges of the wipers, and means associated with the wipers for engaging said angled ends of the binder to hold the binder with its intermediate portion retracted outwardly from the edges of the wipers.

44. In a machine of the class described, the combination with end lasting mechanism comprising end embracing wipers and means movable relatively to said wipers for applying a binder about an end of a shoe, of means for presenting to said lasting mechanism a binder with its intermediate portion retracted outwardly from the edges of the wipers, and retaining means for engaging the binder to hold it with its intermediate portion thus retracted.

45. In a machine of the class described, the combination with end lasting mechanism comprising end embracing wipers and means movable along the overwiping faces of said wipers to apply a binder about an end of a shoe, of means for presenting to said lasting mechanism a binder having angled ends comprising a member for engaging the intermediate portion of the binder to force the binder lengthwise of the wipers and to position its intermediate portion retracted outwardly from the edges of the wipers, and means for engaging the angled ends of the binder to retain it with its intermediate portion thus retracted.

46. In a machine of the class described, the combination with shoe positioning means and toe embracing wipers relatively movable to wipe the upper heightwise of the toe and inwardly over the insole, and means movable relatively to said wipers for applying a binder about the toe, of means for positioning a binder adjacent to the wipers constructed to insure the positioning of the intermediate portion of the binder outwardly beyond the edges of the wipers in the upwiping operation to prevent its displacement by engagement with the shoe.

47. In a machine of the class described, the combination with toe embracing wipers, and members movable along the overwiping faces of said wipers to apply about the toe a binder having angled ends and to force said ends into the shoe, of members arranged to engage the angled ends of the binder to retain the binder in position to be operated upon by said binder applying members, said binder engaging members being so disposed as to position the binder with its intermediate portion retracted outwardly beyond the edges of the wipers.

48. In a machine of the class described, the combination with shoe positioning means, of toe embracing wipers for wiping the upper into lasted position about the toe of the shoe, and means for applying about the toe a binder provided with angled ends and for forcing its ends into the shoe, said binder applying means being movable relatively to the wipers to impart to the binder a bodily movement lengthwise of the shoe from an initial position in which it is outwardly retracted beyond the edges of the wipers and to force its opposite end portions inwardly at the sides of the shoe.

49. In a machine of the class described, the combination with shoe positioning means, of toe embracing wipers for wiping the upper into lasted position about the toe of the shoe, and means for applying about the toe a binder provided with angled ends and for forcing its ends into the shoe, said binder applying means comprising members having a substantial component of movement of translation lengthwise of the shoe relatively to the wipers at the beginning of the binder applying operation and a component of movement of rotation inwardly toward the sides of the shoe to impart to the binder a bodily movement lengthwise of the shoe and to force its ends inwardly at the sides of the shoe.

50. In a machine of the class described, the combination with shoe positioning means, of toe embracing wipers for wiping the upper into lasted position about the toe of the shoe, and means for applying about the toe a binder provided with angled ends and for forcing its ends into the shoe, said binder applying means comprising plates mounted for movement along the overwiping faces of the wipers and means to cause them to move in predetermined paths relatively to the wipers each with a component of bodily movement lengthwise of the shoe and a component of swinging movement laterally of the shoe with said first-named component of movement relatively large at the beginning of the binder applying operation.

51. In a machine of the class described, the combination with shoe positioning means, of toe embracing wipers for wiping the upper into lasted position about the toe of the shoe, and means for applying about the toe a binder provided with angled ends and for forcing its ends into the shoe, said binder applying means comprising members movable bodily lengthwise of the shoe relatively to the wipers at the beginning of the binder applying operation and movable also laterally of the shoe to apply and fasten the binder.

52. In a machine of the class described, the combination with shoe positioning means, of toe embracing wipers for wiping the upper into lasted position about the toe of the shoe, and means for applying a binder about the toe comprising members mounted for movement relatively to the wipers and guiding means for said members comprising guideways for determining respectively the directions of movement of points on the inner and outer end portions of said members, one of the guideways for each member being concave toward the edges of the wipers and the other convex toward said edges and said different guideways being so arranged relatively to each other and to the wipers as to determine for each of said members a component of translatory movement lengthwise of the shoe and a component of rotatory movement laterally of the shoe.

53. In a machine of the class described, the combination with shoe positioning means, of toe embracing wipers for wiping the upper into lasted position about the toe of the shoe, and means for applying a binder about the toe comprising plates mounted for movement along the overwiping faces of the wipers and means for guiding said plates comprising for each plate guide blocks pivotally connected respectively to the inner and outer end portions of the plate and movable in curved guideways one of which is concave and the other convex toward the edges of the wipers to determine for said plate a component of translatory movement lengthwise of the shoe and a component of rotatory movement laterally of the shoe.

54. In a machine of the class described, the combination with shoe positioning means, of toe embracing wipers for wiping the upper into lasted position about the toe of the shoe, and means for applying about the toe a binder having angled ends and for forcing its ends into the shoe, said binder applying means comprising plates movable along the overwiping faces of the wipers each with a substantial component of bodily movement lengthwise of the shoe at the beginning of the binder applying operation to apply the binder in holding engagement with the upper at the end of the toe.

55. In a machine of the class described, the combination with shoe positioning means, of toe embracing wipers for wiping the upper into lasted position about the toe of the shoe, and means for applying a binder about the toe comprising plates movable along the overwiping faces of the wipers and guiding means for said plates comprising guideways for determining respectively the directions of movement of points on the inner and outer end portions of the plates, the guideway for the outer end portion of each plate being concave toward the edges of the wipers and the guideway for the inner end portion of the plate being convex toward said edges and curving outwardly toward the other guideway.

56. In a machine of the class described, the combination with shoe positioning means, of toe embracing wipers for wiping the upper into lasted position about the toe of the shoe, and means for applying a binder about the toe comprising plates movable along the overwiping faces of the wipers and guiding means for said plates comprising guideways for determining respectively the directions of movement of points on the inner and outer end portions of the plates, the guideway for the outer end portion of each plate being concave toward the edges of the wipers and the guideway for the inner end portion of the plate being convex toward said edges and nearer to said edges than the other guideway.

57. In a machine of the class described, the combination with shoe positioning means, of toe embracing wipers for wiping the upper into lasted position about the toe of the shoe, and means for applying about the toe a binder provided with angled ends and for forcing its ends into the shoe, said binder applying means having a predetermined movement relatively to the wipers to impart to the binder first a bodily movement lengthwise of the shoe to apply it to the upper about the end of the toe and thereafter to force the ends of the binder into the shoe materials at the sides of the toe.

58. In a machine of the class described, the combination with shoe positioning means, of toe embracing wipers for wiping the upper into lasted position about the toe of the shoe, and means for applying about the toe a binder provided with angled ends and for forcing its ends into the shoe, said binder applying means comprising members guided to receive a component of movement of translation lengthwise of the shoe relatively to the wipers and a component of movement of rotation toward the sides of the shoe with the movement of translation predominating at the beginning of the binder applying operation and the movement of rotation predominating at the end of said operation.

59. In a machine of the class described, the combination with shoe positioning means, of toe embracing wipers for wiping the upper into lasted position about the toe of the shoe, and means for applying about the toe a binder provided with angled ends and for forcing its ends into the shoe, said binder applying means comprising members movable relatively to the wipers in paths substantially parallel to the overwiping faces of the wipers, and means for moving said members bodily lengthwise of the shoe relatively to the wipers while swinging them inwardly toward the sides of the shoe and for decreasing their component of bodily movement relatively to their component of swinging movement as the binder applying operation progresses.

60. In a machine of the class described, the combination with shoe positioning means, of toe embracing wipers for wiping the upper into lasted position about the toe of the shoe, and means for applying about the toe a binder provided with angled ends and for forcing its ends into the shoe, said binder applying means comprising plates movable along the overwiping faces of the wipers, and guiding means for said plates constructed to determine a comparatively large component of movement of translation of the plates lengthwise of the shoe at the beginning of the binder applying operation with a simultaneous swinging movement of the plates toward the sides of the shoe and thereafter a comparatively small component of movement of translation of said plates as their inwardly swinging movement continues.

61. In a machine of the class described, the combination with shoe positioning means, of toe embracing wipers for wiping the upper into lasted position about the toe of the shoe, and means for applying about the toe a binder provided with angled ends and for forcing its ends into the shoe, said binder applying means comprising plates movable along the overwiping faces of the wipers, and guiding means for said plates comprising guideways for determining respectively the directions of movement of points on the inner and outer end portions of the plates, the guideway for the outer end portion of each plate being concave toward the edges of the wipers and the guideway for the inner end portion of the plate convex toward said edges and so disposed as to determine a comparatively large component of movement of translation of the plate lengthwise of the shoe at the beginning of the binder applying operation while the plate is swinging inwardly toward the side of the shoe with a decrease in said component of translatory movement while the swinging movement continues in the latter portion of the binder applying operation.

62. In a machine of the class described, the combination with shoe positioning means, of toe embracing wipers for wiping the upper into lasted position about the toe of the shoe, means for positioning a binder adjacent to said wipers constructed to insure the positioning of the intermediate portion of the binder outwardly beyond the edges of the wipers, and binder applying means movable relatively to the wipers to force the intermediate portion of said binder forwardly at the end of the toe and to bend the binder inwardly toward the sides of the toe.

63. In a machine of the class described, the combination with shoe positioning means and toe embracing wipers relatively movable to wipe the upper heightwise of the toe and inwardly over the insole, of means for positioning a binder adjacent to the overwiping faces of said wipers and for retaining it with its intermediate portion retracted outwardly beyond the edges of the wipers to prevent its displacement by engagement with the shoe, and binder applying members having a component of movement of translation lengthwise of the shoe and a component of movement of rotation toward the sides of the shoe to force the intermediate portion of the binder forwardly and to force its end portions inwardly toward the sides of the shoe.

64. In a machine of the class described, the combination with shoe positioning means and toe embracing wipers relatively movable to wipe the upper heightwise of the toe and inwardly over the insole, of means for positioning adjacent to the overwiping faces of the wipers a binder having angled ends and for retaining it with its intermediate portion retracted outwardly beyond the edges of the wipers, and binder applying means movable along the overwiping faces of the wipers to advance the binder bodily into holding engagement with the upper at the end of the toe and then to force the ends of the binder into the shoe.

65. In a machine of the class described, the combination with shoe positioning means, of end embracing wipers, means for moving said wipers lengthwise of the shoe, and closing devices for the different respective wipers comprising normally stationary members for effecting in response to the movement of the wipers lengthwise of the shoe closing movement of said wipers laterally of the shoe, each of said closing devices being adjustable to permit limited movement of its closing member with the wipers at the beginning of the movement of the wipers lengthwise of the shoe to delay the beginning of the closing movement of the wiper associated with said member.

66. In a machine of the class described, the combination with shoe positioning means, of end embracing wipers, means for moving said wipers lengthwise of the shoe, closing devices for the different respective wipers comprising normally stationary rack bars and pinions connecting them to the wipers for closing the wipers in response to their movement lengthwise of the shoe, and controlling devices for the different respective rack bars adjustable each independently of the other to permit a variably limited movement of either or both of said rack bars at the beginning of the advancing movement of the wipers to delay the beginning of the closing movements of the different respective wipers.

67. In a machine of the class described, the combination with shoe positioning means, of end embracing wipers, means for moving said wipers lengthwise of the shoe, closing devices for the different respective wipers comprising normally stationary rack bars and pinions connecting them to the wipers for imparting to the wipers closing movements laterally of the shoe in response to their movement lengthwise of the shoe, springs for holding said rack bars normally stationary, and adjusting devices associated with the different respective rack bars and movable against the resistance of said spring to provide for each of said rack bars independently of the other a variably limited free movement to delay the closing movement of its wiper at the beginning of the advancing movement of the wipers.

68. In a machine of the class described, the combination with shoe positioning means, of toe embracing wipers, means for operating said wipers to wipe the upper about the toe into lasted position, members movable relatively to said wipers to apply about the toe a binder having angled ends and to force its ends into the shoe, rack and pinion mechanism for imparting operative movement to said binder applying members, and manual means to enable the operator to operate said rack and pinion mechanism at will to apply the binder to the shoe after the wipers have wiped the upper into lasted position.

69. In a machine of the class described, the combination with shoe positioning means, of toe embracing wipers, a wiper carrier movable to carry said wipers lengthwise of the shoe, manual means for imparting forward movement to said wiper carrier and for closing the wipers about the toe of the shoe, members associated with said wipers for applying about the toe a binder having angled ends and for forcing its ends into the shoe, rack and pinion mechanism mounted on said wiper carrier for operating said members, and manual means for imparting operative movement to said rack and pinion mechanism.

70. In a machine of the class described, the combination with shoe positioning means, of toe embracing wipers, means for operating said wipers to wipe the upper about the toe into lasted position, members associated with said wipers for applying about the toe a binder having angled ends and for forcing its ends into the shoe, and means for imparting operative movement to said members after the wipers have completed their operative movement comprising rack bars associated respectively with the different members, pinions engaging said rack bars, and operating means having rack teeth engaging said pinions for imparting operative movement to the pinions.

71. In a machine of the class described, a detachable wiper unit comprising wipers relatively movable about an axis to wipe an upper inwardly about an end of a shoe, and a guide member connected to the different wipers to guide them about the axis of their relative inward movements, said guide member being spaced from the wiping edges of the wipers and detachable with the wipers to hold them in assembled relation when detached.

72. In a machine of the class described, a detachable wiper unit comprising a pair of wipers mounted for relative swinging movement about an axis at the end of the toe of a shoe, and a guide member common to the different wipers and having a tongue and groove connection therewith curved about the axis of movement of the wipers, said guide member being detachable with the wipers to hold them assembled when detached.

73. In a machine of the class described, the combination with shoe positioning means, of end embracing wipers and means for operating them to wipe the upper inwardly over the insole about an end of the shoe, and means enabling the operator to effect after the overwiping operation a relative pressure relaxing movement of the shoe and the wipers heightwise of the shoe preparatory to the application of a binder between the wipers and the shoe, said pressure relaxing means having an automatically limited movement to determine the extent of such relative movement of the shoe and the wipers.

74. In a machine of the class described, the combination with shoe positioning means, of end embracing wipers, means for operating said wipers to wipe the upper inwardly about an end of the shoe and for effecting relative movement of the shoe and the wipers heightwise of the shoe to press the upper upon the insole, and independently operated means for effecting a reverse relative movement of the shoe and wipers heightwise of the shoe to facilitate the application of a binder between the wipers and the shoe.

75. In a machine of the class described, the combination with shoe positioning means, of end embracing wipers, means for operating said wipers to wipe the upper inwardly about an end of the shoe and for effecting relative movement of the shoe and the wipers heightwise of the shoe to press the upper upon the insole, and manually operative means for effecting a relative reverse movement of the shoe and the wipers heightwise of the shoe to relax the pressure of the wipers on the shoe, said last-named means having an automatically limited movement to determine the extent of such relative pressure relaxing movement of the shoe and the wipers.

76. In a machine of the class described, the combination with shoe positioning means, of end embracing wipers and means for operating them to wipe the upper inwardly about an end of the shoe, and a device movable from an idle position removed from over the shoe into operative position over the bottom of the shoe to enable the operator to effect a relative pressure relaxing movement of the shoe and the wipers heightwise of the shoe preparatory to the application of a binder between the shoe and the wipers.

77. In a machine of the class described, the combination with a shoe support, of toe embracing wipers, a support for said wipers movable heightwise of the shoe, and a device mounted on said wiper support for effecting by downward thrust toward the bottom of the shoe a relative movement between the shoe and said wiper support heightwise of the shoe to relax the pressure of the wipers upon the upper.

78. In a machine of the class described, the combination with a shoe support, of toe embracing wipers, a support for said wipers movable heightwise of the shoe, and a pressure relaxing device mounted on said wiper support for movement from an idle position to an operative position over the bottom of the shoe and comprising a member arranged to be thrust downwardly toward the bottom of the shoe for effecting by pressure upon the shoe a movement of the wiper support heightwise of the shoe to relax the pressure of the wipers upon the upper.

79. In a machine of the class described, the combination with a shoe support, of toe embracing wipers, a support for said wipers movable heightwise of the shoe, and a pressure relaxing device carried by said wiper support comprising a member movable toward the bottom of the shoe and an eccentric for operating said member to effect a relative movement of the shoe and the wiper support heightwise of the shoe to relax the pressure of the wipers upon the upper.

80. In a machine of the class described, the combination with a shoe support, of toe embracing wipers, a support for said wipers movable heightwise of the shoe, and a pressure relaxing device carried by said wiper support comprising a member having automatically limited movement for effecting a predetermined relative movement of the wiper support and the shoe heightwise of the shoe to relax the pressure of the wipers upon the upper.

81. In a machine of the class described, the combination with a shoe support, of toe embracing wipers, a support for said wipers movable heightwise of the shoe, and a pressure relaxing device on said wiper support comprising a member arranged to be thrust downwardly toward the bottom of the shoe to effect a relative movement of the shoe and the wiper support heightwise of the shoe to relax the pressure of the wipers upon the upper, said member comprising parts relatively adjustable heightwise of the shoe to vary the extent to which the pressure is relaxed.

82. In a machine of the class described, the combination with a shoe support and a holddown for engaging the bottom of the shoe, of toe embracing wipers, a support for said wipers movable heightwise of the shoe, and a pressure relaxing device on said wiper support comprising a member arranged to be thrust downwardly toward the bottom of the shoe and to engage said holddown for effecting relative pressure relaxing movement of the shoe and the wipers heightwise of the shoe.

83. In a machine of the class described, the combination with shoe positioning means, of toe embracing wipers, means for forcing inwardly between the wipers and the shoe a binder having angled ends and for driving said ends into the shoe, and means for effecting a relative pressure relaxing movement of the shoe and the wipers heightwise of the shoe of automatically limited extent preparatory to the driving of the ends of the binder into the shoe.

84. In a machine of the class described, the combination with shoe positioning means, of toe embracing wipers, a support for said wipers movable heightwise of the shoe, means associated with said wipers for forcing inwardly between the wipers and the shoe a binder having angled ends and for driving said ends into the shoe, and a device on said wiper support to enable the operator to effect by downward pressure upon the shoe an upward movement of the wiper support of automatically limited extent preparatory to the driving of the ends of the binder into the shoe.

85. In a machine of the class described, the combination with shoe positioning means, of toe embracing wipers constructed to engage the lateral periphery of the shoe to limit their overwiping movement and having comparatively thin marginal portions for wiping the upper inwardly over the feather of the insole, and means movable along the outer faces of said wipers to apply about the toe a binder having angled ends and to force said ends inwardly into the shoe to anchor the binder.

86. In a machine of the class described, the combination with shoe positioning means, of toe embracing wipers constructed to engage the lateral periphery of the shoe to limit their overwiping movement and having comparatively thin marginal portions for wiping the upper inwardly over the feather of the insole, members arranged relatively to the outer faces of said wipers to provide along said faces a guideway for a binder having angled ends to be forced into the shoe, and members movable in said guideway to apply the binder about the toe and to force its ends into the shoe.

87. In a machine of the class described, the combination with shoe positioning means, of toe embracing wipers, and means mounted for sliding movement upon the outer faces of said wipers to apply a binder about the toe for holding the upper in lasted position.

88. In a machine of the class described, the combination with shoe positioning means, of toe lasting mechanism comprising toe embracing wipers and means movable relatively to said wipers to force forwardly at the end of the toe and inwardly at the sides of the toe a binder provided with angled ends and to drive said ends into the shoe, said lasting mechanism having parts arranged to extend between the ends of the binder and that portion of the upper on the feather of the insole to guard the upper from injury through contact with the ends of the binder.

89. In a machine of the class described, the combination with shoe positioning means, of toe lasting mechanism comprising toe embracing wipers and binder applying means constructed to engage from the end of the toe rearwardly a binder provided with angled ends and arranged to move relatively to the wipers to apply the binder about the toe and to force its ends into the shoe, said wipers having portions arranged to overlie the feather of the insole between the upper and the ends of the binder to guard the upper from injury through contact with the ends of the binder.

In testimony whereof I have signed my name to this specification.

CHARLES F. PYM.